United States Patent [19]

Wetzel

[11] 3,756,722

[45] *Sept. 4, 1973

[54] INTERFEROMETRIC MEASURING SYSTEM

[75] Inventor: Theodore A. Wetzel, Brookfield, Wis.

[73] Assignee: Kearney & Trecker Corporation, West Allis, Wis.

[ * ] Notice: The portion of the term of this patent subsequent to March 4, 1988 has been disclaimed.

[22] Filed: July 29, 1965

[21] Appl. No.: 475,720

[52] U.S. Cl. ............................................... 356/106
[51] Int. Cl. ........................................... G01b 9/02
[58] Field of Search ..................... 88/14 I; 331/94.5; 356/106–113

[56] References Cited
UNITED STATES PATENTS

| | | | |
|---|---|---|---|
| 2,462,292 | 2/1949 | Snyder | 88/14 I |
| 2,479,802 | 8/1949 | Young | 88/14 I |
| 3,225,644 | 12/1965 | Schuch | 88/14 I |
| 3,271,676 | 9/1966 | Chitayat | 88/14 I |
| 2,848,921 | 8/1958 | Koulikovitch | 356/106 |

OTHER PUBLICATIONS

"Coherece Studies of . . . Laser," 9 Physical Review Letters 479.
Rowley, W, A Fringe–Counting Inteferometer Using A Laser, Paper Presented at Conference on Lasers and Applications, London, on Oct. 1, 1964, pp. 4–1, 4–2 and 4–3.

Primary Examiner—Ronald L. Wibert
Assistant Examiner—Conrad Clark
Attorney—W. C. Gleisner, Jr., Donald E. Porter and Cyril M. Hajewski

[57] ABSTRACT

This invention relates to an interferometer particularly adapted to measure distances with extreme accuracy. To obtain maximum accuracy, a base having a table rectilinearly movable thereon is provided with a laser light source for projecting a light beam parallel to the path of table movement. A unitary prismatic element affixed to the base provides a single beam splitter interposed in the path of the laser beam for dividing it into two split beams including a parallel measuring beam and a transverse reference beam. Prismatic reflector means are secured to the table in a position to receive the measuring beam from the unitary prismatic element and reflectively return thereto a continuous, spaced apart parallel measuring beam. An angular reflector is affixed to the unitary primsmatic element for reflecting the returned beam transversely toward the beam divider along a direction and path joining the transverse reference beam for combining therewith to provide interference fringes. The interference fringes extend transversely from the beam splitter to activate a light responsive counting device for indicating the extent of movement between the table and base.

7 Claims, 14 Drawing Figures

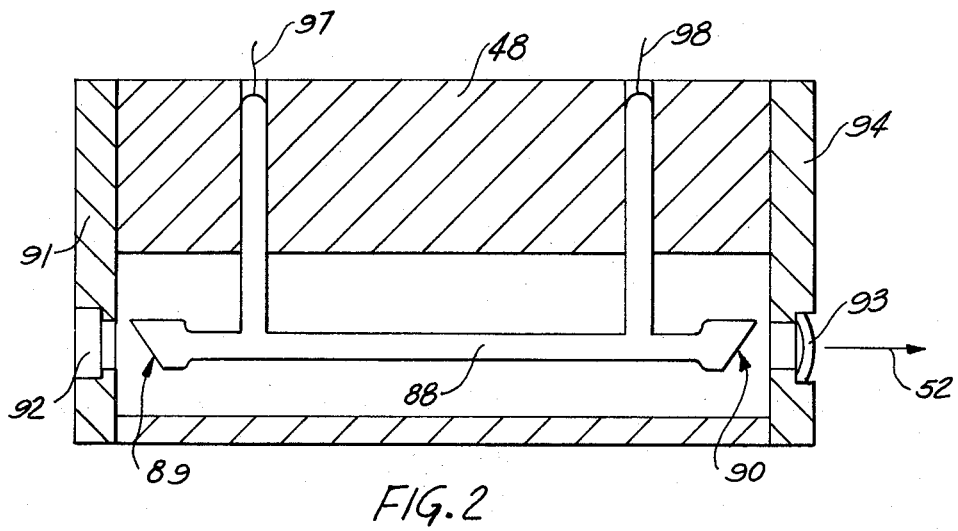
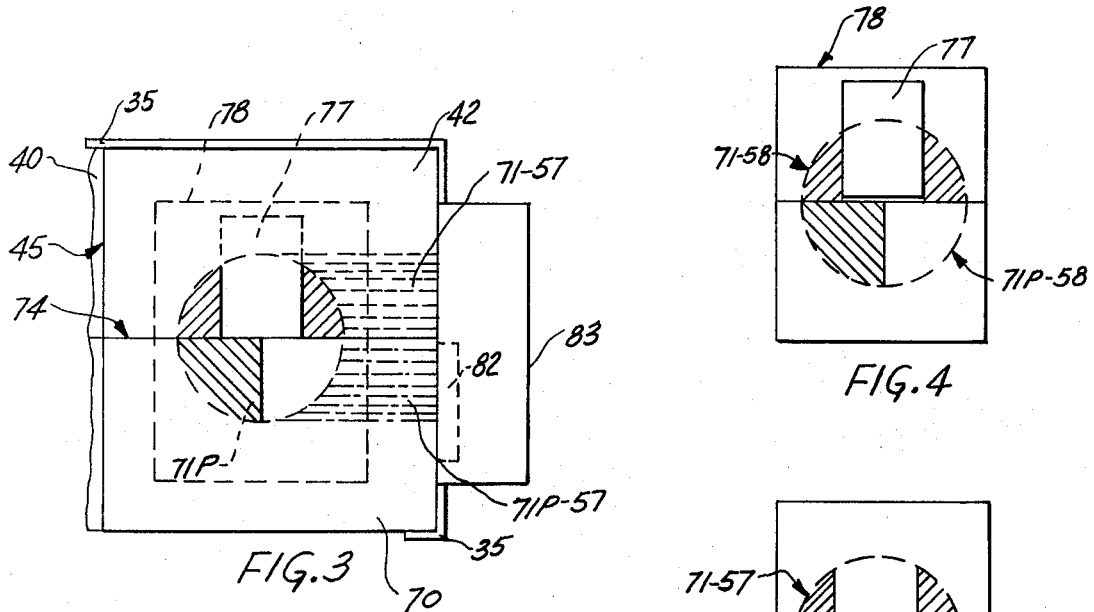
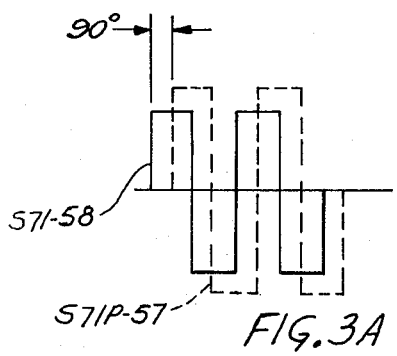

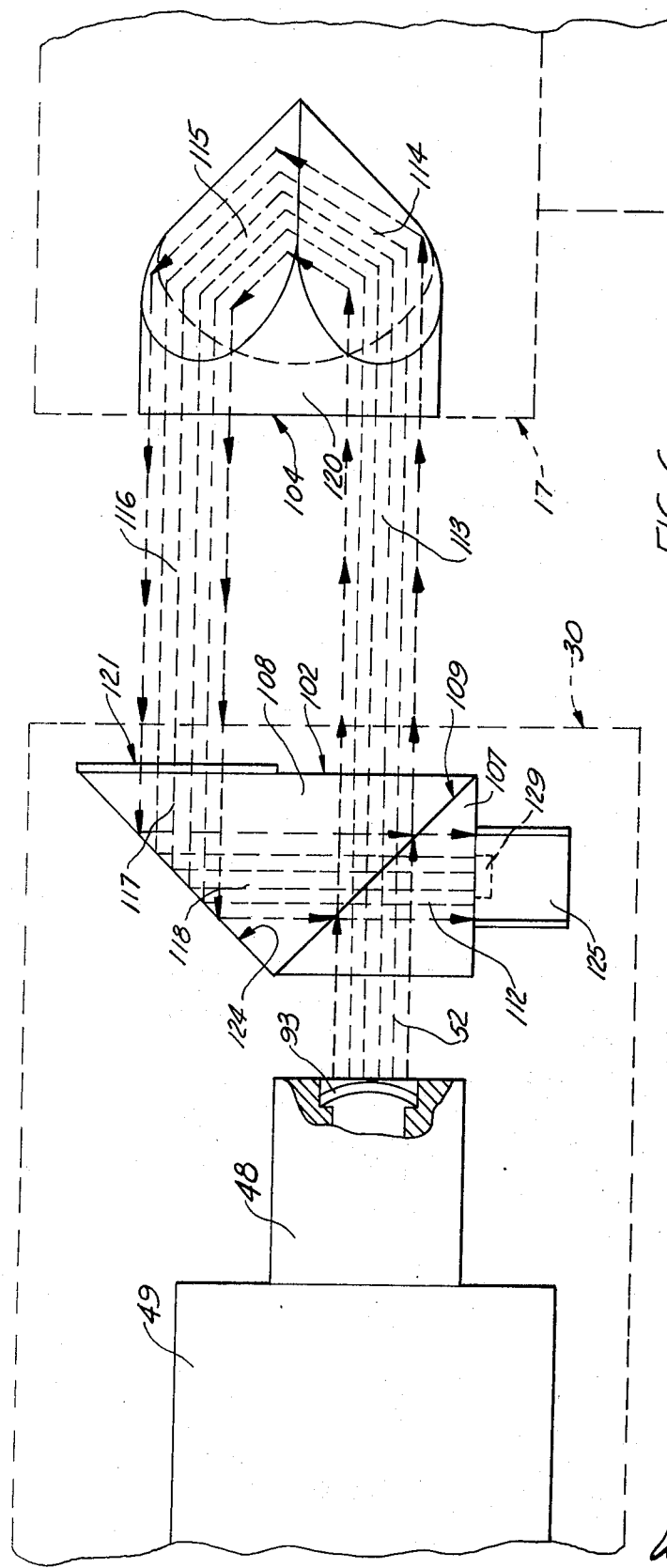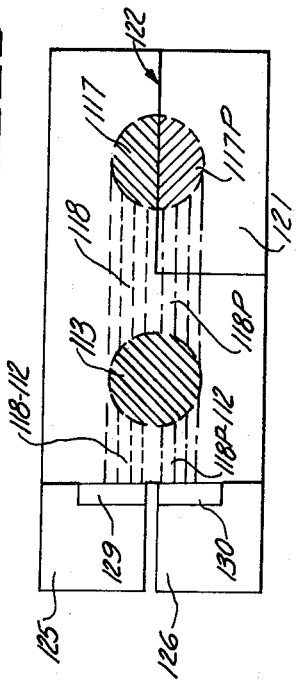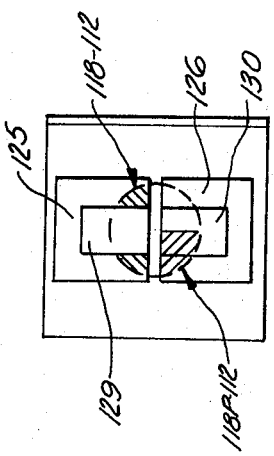
FIG. 6
FIG. 7A
FIG. 7
INVENTOR.
THEODORE A. WETZEL
BY
William C. Gleisner Jr.

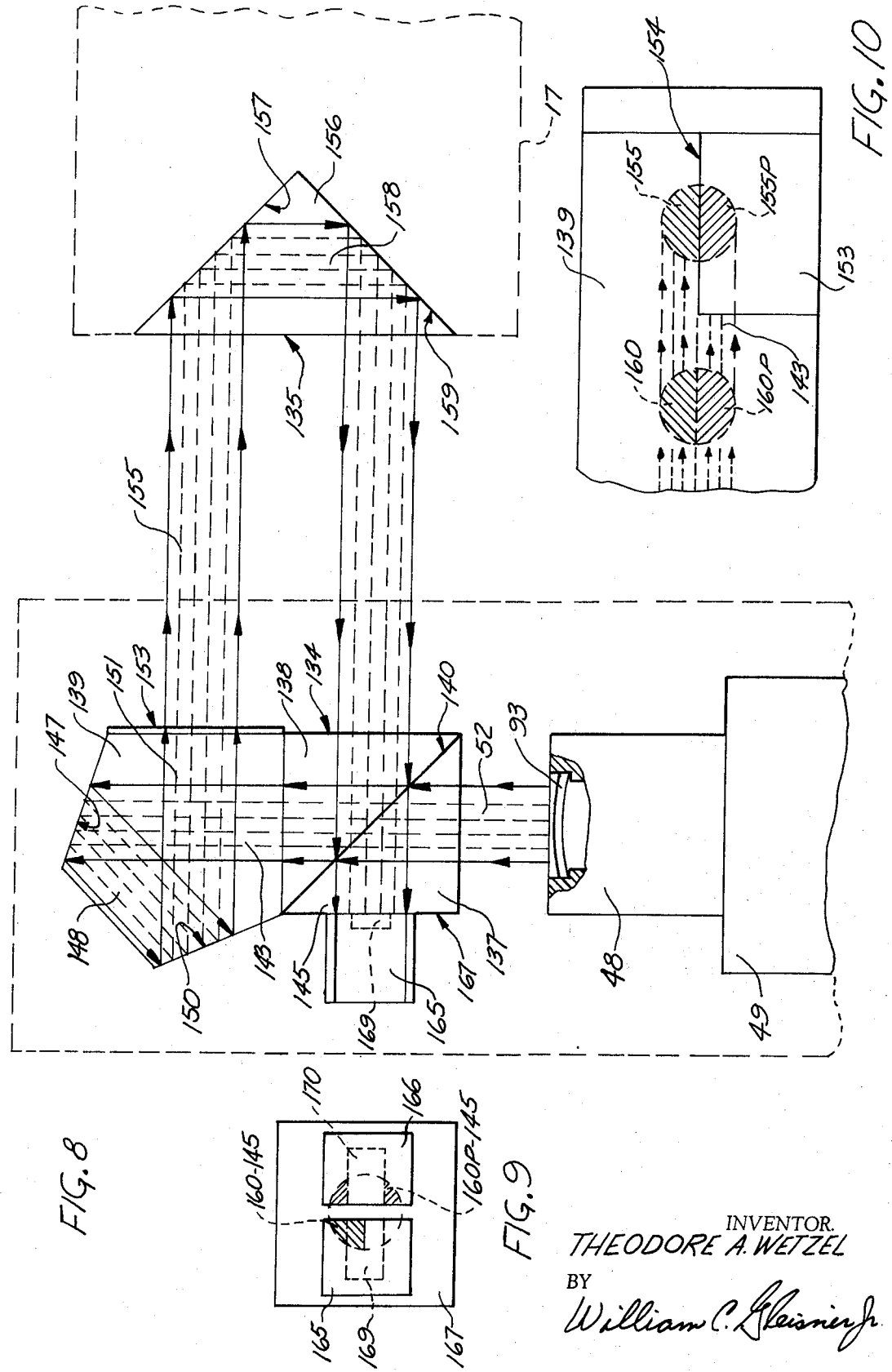

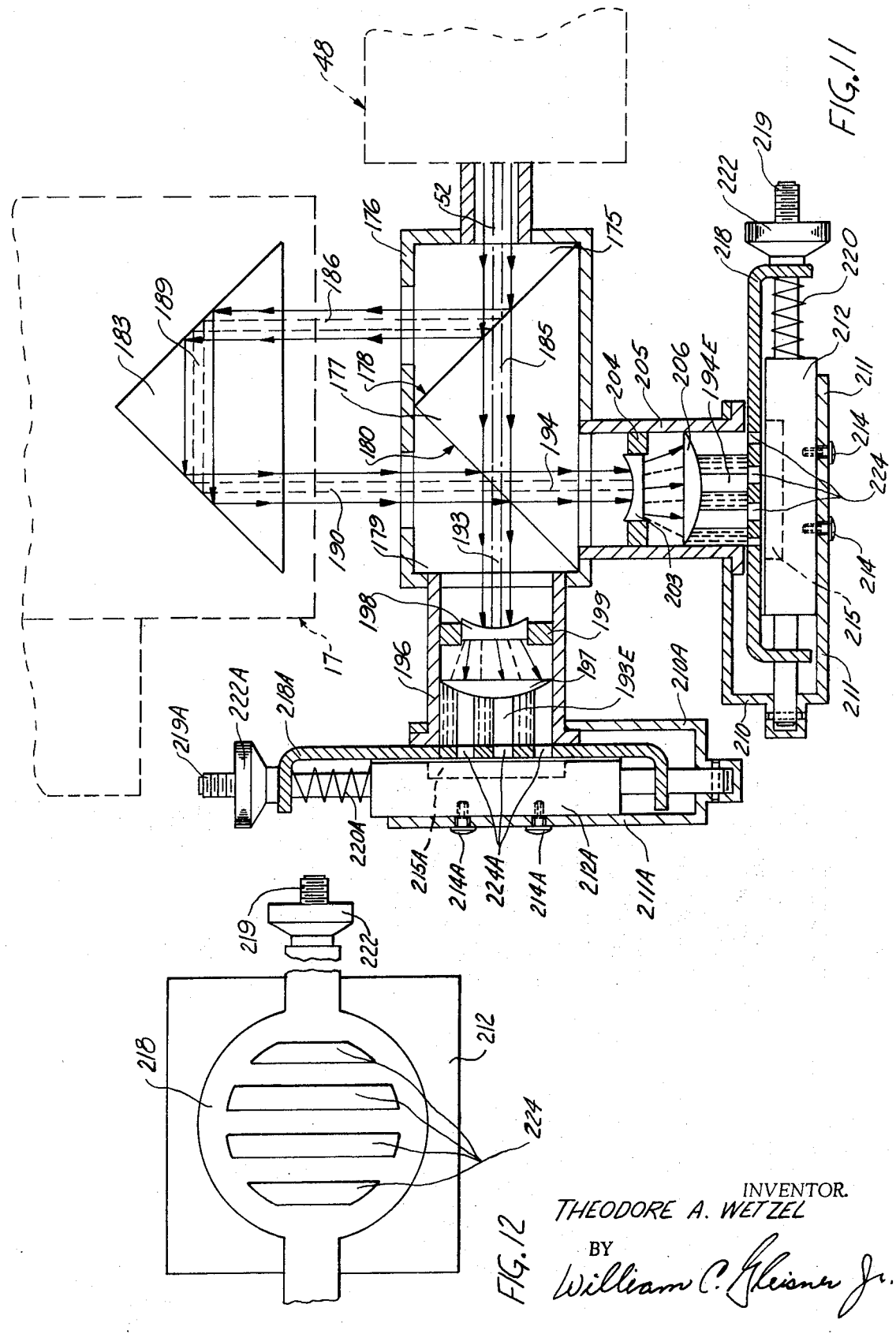

INTERFEROMETRIC MEASURING SYSTEM

This invention relates generally to measuring instruments, and more particularly to an improved interferometer having a simplified optical circuit in combination with a laser light source.

As known in the prior art, an interferometer measures distance by splitting entrant light from the same extended light source into two beams comprising a fixed length reference beam and a variable length measuring beam. Semi-transparent optical means are provided both to split light from the entrant source into two beams and to recombine the beams to develop fringe patterns representative of the distance being measured. The two split light beams are directed respectively over a fixed length reference path and a variable length measuring path, both of which include reflectors for reflecting each of these associated beams along a coincident return pathway for recombining to develop the interference fringes indicative of the distance traversed.

A general object of this invention is to provide an improved interferometric optical circuit having unidirectional beam pathways for both the reference and measuring beams.

Another object of the invention is to provide an interferometer having an optical circuit with a minimum number of reflective surfaces for the reference beam reference and the variable length measuring beams.

Another object is to provide an improved laser actuated interferometer with an improved optical circuit that prevents light beam feedback to the output light source from the laser, and require only one semi-transparent light beam splitter.

Another object is to utilize masks or gratings to achieve an output signal comparable to quadrature phase spacing in different portions of interference fringe patterns representative of distance measurement.

The foregoing and other objects of this invention which will become more fully apparent from the following detailed description of exemplifying apparatus, may be achieved by the particular length measuring device and interferometer described herein as a preferred embodiment thereof in connection with the accompanying drawings, in which:

FIG. 2 is an enlarged detail view in longitudinal section of a laser constituting a preferred light source for the measuring instrument;

FIG. 3 is an enlarged view of the quarter wave, phase differentiating plate interposed in the variable length measuring beam;

FIG. 3A is a schematic drawing of square waves spaced in quadrature;

FIG. 4 is an enlarged fragmentary detailed view of the photo detector responsive to one of the phase differentiated fringe patterns of the recombined beams;

FIG. 5 is an enlarged fragmentary view of another photo detector responsive to the phase differentiated fringes in the other half of the variable length measuring beam;

FIG. 6 is an enlarged schematic representation of a modified form of the interferometer having a single beam splitter and a unidirectional path for the variable length measuring beam;

FIGS. 7 and 7A are enlarged detailed, fragmentary views respectively illustrating the photo detectors, and a transverse section through the measuring beam pathways of the interferometer illustrated in FIG. 6;

FIG. 8 is an enlarged schematic representation of another modified form of the interferometer utilizing a pentaprism;

FIGS. 9 and 10 are fragmentary detail views respective illustrating the photo detectors and a transverse section through the measuring beam pathway of the interferometer illustrated in FIG. 8;

FIG. 11 is a schematic view of another modified form of the invention; and;

FIG. 12 is an enlarged detailed view of a mask shown in FIG. 11.

Figure 1:
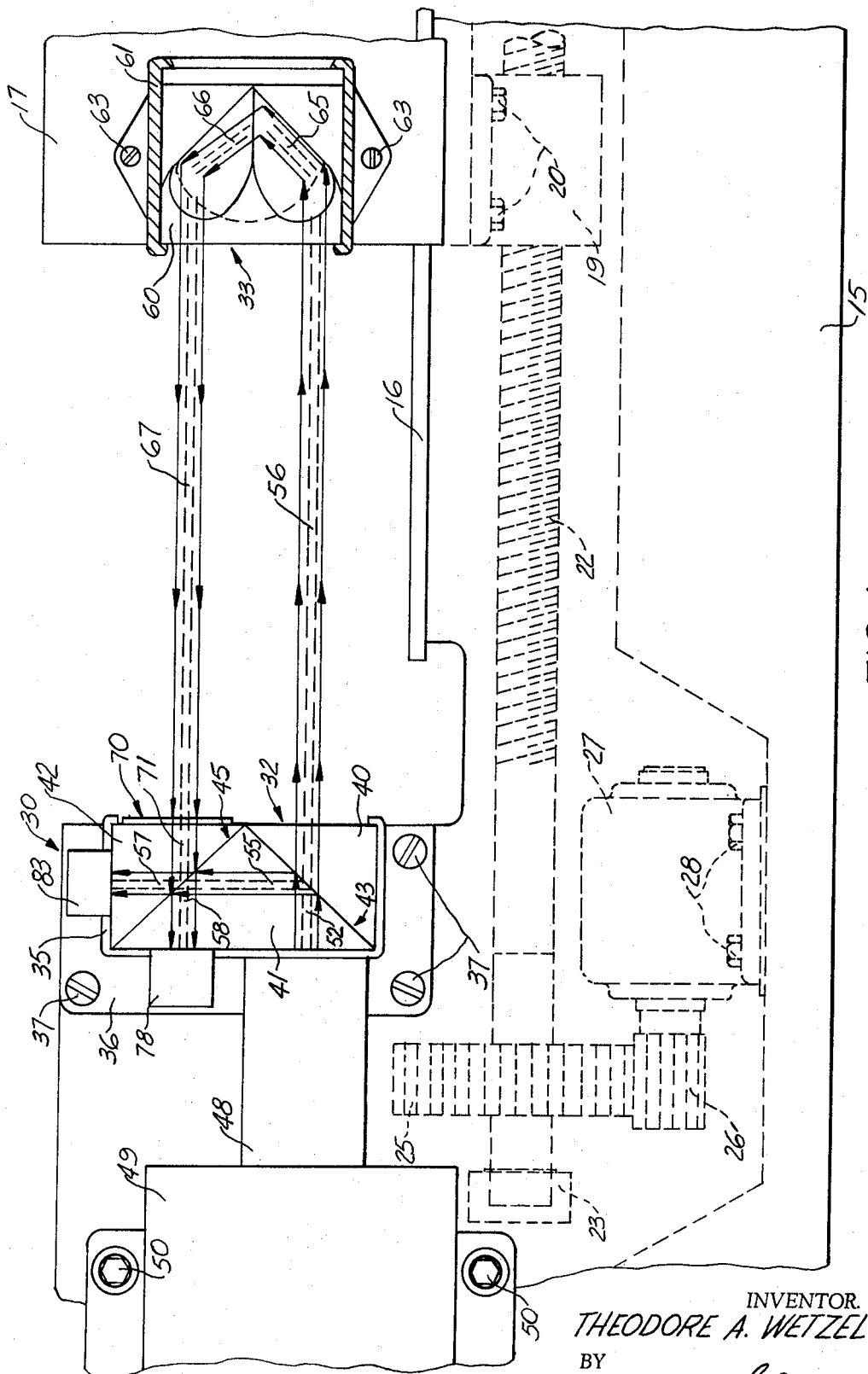
FIG. 1 is an enlarged fragmentary view, partly schematic and partly in side elevation, of a machine incorporating an improved interferometric length measuring instrument.

Referring particularly to the drawings, a machine adapted to effect extremely precise length measurements over an extended path of travel is illustrated in fragmentary form in FIG. 1. As there shown, the machine comprises essentially a supporting base 15 provided with the usual, laterally spaced apart, longitudinally extending way surfaces, only one of which is represented in FIG. 1, as 16. The spaced apart, longitudinally extending way surfaces including 16, are adapted to slidably support a work supporting table or carriage 17 for longitudinal sliding movement. For moving the worktable 17 along the ways 16, a depending nut 19 is secured to the underside thereof by means of cap screws 20. The nut 19 is disposed to threadedly engage a rotatable translating screw 22 journalled to rotate at its rightward end within a bearing (not shown) and at its leftward end within a bearing 23 carried in the supporting base 15. For rotating the translating screw 22, a gear 25 secured thereto is engaged by a drive pinion 26 driven by a motor 27 secured within the machine frame 15 by means of cap screws 28. The usual selectively energizeable drive circuit (not shown) is provided to reversibly energize the motor 27 for moving the worktable 17 in a selected longitudinal direction. To effect manual longitudinal movement of the worktable 17 along the supporting ways, a hand crank (not shown) may be applied in well-known manner to one end of the table translating screw 22.

During longitudinal movement, the exact position of the worktable 17 is interferometrically measured with respect to a reference portion or headstock 30 integrally formed with the machine base 15. To accomplish this, a variable length measuring light beam is transmitted from a single, unitary prismatic element 32 toward a cooperating prismatic reflector 33 fixedly carried by the longitudinally movable work table 17. The cooperating unitary prismatic element 32 and relatively movable prismatic reflector 33 comprise the principal optical elements of the distance measuring interferometer represented in FIG. 1.

As shown in FIG. 1, the beam projecting prismatic element 32 is mounted within an enclosure 35 integrally formed with a support plate 36 secured to the carriage 30 by means of filister head screws 37. Actually, the unitary prismatic element 32 comprises prisms 40, 41 and 42 that are adhesively secured together along interfaces 43 and 45 respectively. The interface 43 comprises a partially silvered surface to constitute a partially light transmissive, partially light reflective beam splitting surface between prisms 40 and 41. In a similar manner, the interface 45 is partially silvered to constitute a light transmissive partially reflective light beam splitting surface between the prisms 41 and 42. Thus, the unitary prismatic element 32 shown in FIG. 1 is provided with two spaced apart, light beam splitting surfaces or beam splitters 43 and 45 respectively.

In spaced leftward relationship to the prismatic enclosure 35, there is provided a laser enclosure 48 carried by a support member 49 fixedly secured to the frame 15 by means of cap screws 50. The arrangement is such that the rightward end of the laser housing 48 is provided with an output beam opening that is aligned with a corresponding opening in the prismatic enclosure 35 to direct an intense output beam 52 of monochromatic light to the prism 41. The laser output beam 52 is directed longitudinally outward toward the semi-transparent, beam splitter 43 which operates in well-known manner to divide the output beam 52 into two split beams 55 and 56 respectively. The internally reflected split beam 55 constitutes the reference beam which is directed toward the semi-reflective beam splitter 45, which again divides the reference beam 55 into two separate reference beam components 57 and 58.

From the prism 40 of the unitary prismatic element 32, the longitudinally projected split beam 56 is directed outwardly toward the prismatic beam reflector 33, which is represented in FIG. 1 as a trihedral prism 60. The trihedral prism 60 is carried within a tubular enclosure 61 which is secured to the longitudinally movable worktable 17 by means of filister head screws 63.

As known in the art, a trihedral prism such as the prism 60 is provided with three orthogonal reflective surfaces to provide a corresponding three internal reflections for maintaining exact parallelism between an input beam to the trihedral prism and an output beam emanating therefrom. As schematically illustrated in FIG. 1, the variable length measuring beam 56 is internally reflected by a first reflective face of the trihedral prism 60 to a beam component 65, which is in turn reflected by a second reflective prism face as a beam component 66, the latter being reflected by a third face of the trihedral prism 60 to emerge as an output beam 67. The input beam 56 to the trihedral prism 60 is parallel to the output beam 67 reflectively projected therefrom as a return beam. Actually, it will be apparent that the beams 56, 65, 66 and 67 comprise one continuous, unidirectional measuring beam, with the return beam component 67 being directed toward the prism 42 of the unitary prismatic element 32. Partially interposed in the return pathway of the measuring beam 67 is a quarter wave, phase modifying plate 70 which is adhesively secured to the base of the prism 42. As will hereinafter be more fully explained, the phase differentiating plate 70 is interposed in the path of the returned measuring beam 67 to provide two phase differentiated components in the continuing internal beam 71, with the two components thereof preferably spaced in quadrature.

As shown in FIG. 1, the returned measuring beam 71 is directed to the semi-transparent beam splitter 45 for division thereby into two beam components that are respectively coincidental with the fixed length reference beam components 57 and 58.

As represented in FIGS. 1 and 3, the transparent quarter phase plate 70 is bonded directly to the base of the prism 42 and is provided with an upper, transverse edge 74 that is perpendicular to the apex of the prism 45 in a manner to be transversely interposed in the pathway of the reflectively returned beam 67 from the trihedral prism 60. Thus, as shown in FIG. 3, the quarter phase plate 70 divides the reflectively returned beam into two internal phase differentiated beam components 71 and 71P. As hereinbefore explained, the phase differentiated beam components 71 and 71P are recombined with the internal reference beam 55 along the semi-transparent beam splitting interface 45. After recombining it will be apparent that the split reference beam components 57 and 58, FIG. 1, will each be combined with the phase differentiated beam components 71 and 71P of the reflectively returned measuring beam, FIG. 3. These relationships are more clearly illustrated in FIGS. 4 and 5. As shown in FIG. 4, the phase differentiated beam components are indicated as 71-58 and 71P-58. As further shown in FIG. 4, the interface fringe patterns 71-58 are operative to activate a light sensitive detector 77 of a photo detector 78 that is secured to the housing 35, FIG. 1, in proper alignment with the reference beam components 58. In FIG. 1, the photo detector 83 is secured to the enclosure 35 in a position to operatively receive the reference beam component 57.

As shown in FIGS. 3 and 5, the divided reference beam component 57 is combined with the internal, phase differentiated measuring beam com-ponents 71 and 71P to provide the separate interference fringe patterns 71-57 and 71P-57. As represented in FIGS. 3 and 5, however, the photo detector 83 is so secured to the support enclosure 35 that the light sensitive detector 82 is positioned to be activated only by the interference fringe patterns 71P-57. In a similar manner, as shown in FIG. 5, the same relationship is shown in which the photo detector 83 is so positioned that the light sensitive detector 82 is carried in a position to be activated only by a predetermined 180° portion of the interference fringe pattern 71P-57. The light sensitive detectors 77 and 82 represented in FIGS. 4 and 5 may be high resistance silicon units. In comparing FIGS. 4 and 5, it will be apparent that the fringe patterns 71-58, FIG. 4, are spaced in quadrature relative to the fringe patterns 71P-57 in FIG. 5, due to the operation of the quarter phase plate 70, FIG. 3. The output from the detectors 77 and 82 comprise two electrical signals 90° out of phase, corresponding to the frequency generated by the changing, phase differentiated, separate sets of interference fringe patterns 71-58 and 71P-57 respectively. The quadrature spaced electrical signals S71-58 and SP71-57 are represented in the 90° phase shifted positions emanating from the detectors 77 and 82, and may be connected to effect reversible operation of a bi-directional counting circuit (not shown) which is operable to determine both the direction and extent of relative movement between the unitary prismatic element 32 and the prismatic reflector 33 shown in FIG. 1.

The laser constituting a preferred form of light source for the interferometer illustrated in FIG. 1 is shown in simplified form in FIG. 2. As known in the art, the word "laser" is an acronym for the complete descriptive phrase "light amplification by stimulated emission of radiation." As shown in FIG. 2, a discharge or plasma tube 88 is supported within the laser enclosure or housing 48. At its opposite ends, the plasma tube 88 is provided with optical flat surfaced windows 89 and 90 integrally formed therewith and inclined at Brewster's angle. An end bracket 91 secured to the housing 48 is provided with a plain mirror or "end reflector" 92 supported at the rearward end of the plasma tube 88 in axial alignment therewith. At the forward end of the plasma tube 88, a combined partially reflective spherical and collimating lens 93 is supported by another end bracket 94 secured to the housing 48. The discharge tube 88 contains helium and neon which is raised to excited energy levels by current applied to input conductors 97 and 98 from an appropriate source of electrical energy (not shown) in well-known manner. As this occurs, light is reflected back and forth between the total end reflector 92 and the spherical reflector 93 which is slightly less reflective than the reflector 92 in a manner to be semi-transparent for transmitting light. As these light waves continue to travel back and forth, the amplitude increases until a coherent, monochromatic beam of light is emitted by the semi-transparent, combined spherical and collimating lens 93. The coherent output light beam 52 is provided to activate the interferometer illustrated in FIG. 1. Preferably, the laser illustrated schematically in FIG. 2 is a single mode, continuous helium-neon gas laser operating at a wave length of 6,328 Angstrom Units that is adapted to emit an intense light beam, particularly suited for long path operation of the interferometric length measuring instrument disclosed herein.

Referring again to FIG. 4, the fringe patterns 71-58 thereshown comprise alternate light and dark bands, with one light and one dark band occurring during each single cycle of operation. During forward movement of the prismatic reflector 33, FIG. 1, toward the headstock 30, the alternate light and dark bands of the interference fringe pattern 71-58, FIG. 4, move rightwardly relative to the stationary, light sensitive photo detector 77. At the same time, during forward movement of the prismatic reflector, the 90° phase spaced fringe patterns 71P-57, FIG. 5, move rightwardly relative to the stationary light sensitive photo detector 82.

Conversely, during rearward movement of the prismatic reflector 33 FIG. 1, away from the prismatic element 32, FIG. 1, the interference fringe patterns 71-58, FIG. 4, move leftwardly relative to the stationary photo detector 77; and the fringe patterns 71P-57, FIG. 5, likewise move leftwardly relative to the light sensitive photo detector 82. During relative movement of the prismatic reflector in either selected direction, it is moved a distance corresponding to one wave length of light during each cycle of operation.

A modified form of the invention is schematically illustrated in FIG. 6 in which a unitary beam projecting prismatic element 102 is carried for movement relative to a prismatic beam reflector 104. To facilitate the disclosure, it will be understood that the prismatic reflector 104 is secured to a worktable, such as the work supporting table or carriage 17 which is carried for rectilinear longitudinal movement relative to a fixed reference machine portion or headstock 30. Likewise, the unitary beam projecting element 102 is fixedly secured to the machine headstock 30 in predetermined fixed relationship to the laser 48 which is carried by the support member 49. As hereinbefore explained, the laser 48 is provided with a combined semi-reflective, spherical and light transmissive collimating lens 93 adapted to provide an intense, monochromatic light beam 52 for projecting to the prismatic element 102. The headstock reference portion 30 is integrally formed with the machine frame or base 15 as hereinbefore explained, and as shown in FIG. 1. Although schematically represented in FIG. 6, it will be understood that the laser 48 is carried in predetermined fixed relationship to the unitary beam projecting prismatic element 102. Further, the prismatic reflector 104 is carried for longitudinal, rectilinear movement along a path parallel to the laser output beam 52 as well as the variable length measuring beam projected outwardly from the prismatic element 102.

As illustrated in FIG. 6, the unitary prismatic element 102 comprises a prism 107 adhesively bonded to a prism 108 along a semi-silvered interface 109 which comprises a semi-transparent and partially reflective single light beam splitter. The light beam splitter or interface 109 is adapted both to divide the output beam 52 into two split beams, as well as to recombine the split beams for producing interference fringe patterns.

Initially, as shown in FIG. 6, the partially reflective beam splitter 109 is adapted to reflect one half of the beam 52 along a perpendicular path identified as a reference beam component 112. Inasmuch as the beam splitter 109 is partially light transmissive, the other one half of the output beam 52 is transmitted therethrough as a split beam 113 which is projected toward the prismatic reflector 104 to constitute a variable length measuring beam. Although other forms of reflecting means may be used with equal effectiveness, the prismatic reflector 104 preferably comprises a trihedral prism 120. As hereinbefore explained, a trihedral prism is provided with three mutually perpendicular faces in a manner that an input beam directed thereto as schematically illustrated in FIG. 6 experiences three internal reflections and emerges along a return path parallel to the input beam. The beam 113 projected by the prismatic element 102 enters the trihedral prism 120, is internally reflected as a beam component 114, which is reflected as a beam component 115, the latter reflectively emerging from the trihedral prism as a return beam component 116 which is parallel to the beam 113. Thus, the light beam 113, together with beam components 114, 115 and 116 constitute one continuous, unidirectional measuring beam that varies in length according to the positioning movement of the trihedral prism 120 relative to the beam projecting prismatic element 102. In effect, the trihedral prism 120 operates to fold the input beam 113 into a spaced apart, parallel return beam 116.

As shown in FIGS. 6 and 7A, a transparent, quarter wave plate 121 is adhesively bonded to a portion of the base of the prism 108. The phase modifying plate 121 is provided with a transverse edge 122 that is disposed to divided the reflectively returned measuring beam 116 into two adjacent, phase differentiated beam components 117 and 117P, as shown in FIG. 7A. The plate 121 operates to retard the beam component 117P one quarter wave relative to the beam component 117. After passing the quarter wave plate 121 and entering the prism 108, the phase differentiated beam components 117 and 117P are internally reflected by an internal reflective face 124 integrally formed with the prism 108. After being reflected by the internal prism face 124, the phase differentiated beam components of the reflected beam 118 recombine with the reference beam component 112, FIGS. 6 and 7, along the semi-transparent beam splitting interface 109. To more clearly identify the resulting interference fringe patterns which are spaced in quadrature, the fringe patterns are identified in FIGS. 7 and 7A as 118-112 and 118P-112.

In the optical circuit disclosed in FIGS. 6, 7 and 7A, it will be apparent that no optical circuit or internal reflectors are required for the reference beam path. In effect, no reference beam is actually shown or illustrated as a reference beam, per se. In other words, the reference beam in FIG. 6 actually extends from the spherical laser lens 93 to the beam splitter 109, and comprises only that one-half of the interferometer entrant beam 52 that is not transmitted through the beam splitter 109 to be projected as the one-half or split measuring beam 113. Likewise, after the measuring beam has completed its unidirectional optical circuit from the beam splitter 109 and is returned thereto as phase differentiated beam components 118 and 118P, FIG. 7A, the beam splitter 109 operates to recombine these beam components with that one half of the entrant beam 52 that has not been transmitted through the beam splitter 109. Consequently, phase differentiated fringe patterns 118-112 and 118P-112, preferably spaced in quadrature, are produced immediately upon the recombining to provide an indication of the direction and extent of relative movement between the beam projecting prismatic element 102 and the prismatic beam reflector 104.

From the semi-transparent interface 109, FIG. 6, the phase differentiated interference fringe patterns 118-12 and 118P-112, FIGS. 7 and 7A, are directed toward photo detectors 125 and 126 respectively secured to a side face of the prism 107. The photo detectors 125 and 126 are respectively provided with light sensitive detectors 129 and 130 which are respectively responsive to the phase differentiated fringe patterns 118-112 and 118P-112. As hereinbefore explained, the light sensitive detectors 129 and 130 are disposed to be connected to a bi-directional counting circuit for indicating both the direction and extent of relative movement between the relatively movable prismatic reflector 104, FIG. 6, and the unitary prismatic element 102.

In FIGS. 8, 9 and 10, there is schematically represented another modified form of the invention comprising a beam projecting prismatic element 134 and a relatively movable prismatic reflector 135. As shown in FIG. 8, the prismatic beam reflector 135 may be secured to the work support 17 carried for longitudinal movement by machine guideways (not shown) relative to the machine reference portion or headstock 30 of a machine. Likewise, the unitary beam projecting prismatic element 134 is fixedly secured to the machine headstock 30 in predetermined fixed relationship to the laser 48 carried by the support housing 49 secured to the machine headstock 30.

As represented in FIG. 8, the combined spherical reflector and collimating lens 93 of the laser 48 is adapted to project a monochromatic light beam 52 vertically upward toward a prism 137. The prism 137 is adhesively bonded to a prism 138, which in turn is adhesively bonded to a sideface of a pentaprism 139. Thus, the unitary beam projecting prismatic element 134 in FIG. 8 comprises the three prisms 137, 138 and 139 respectively. A semi-silvered interface 140 between the prisms 137 and 138 constitutes a semi-transparent, and semi-reflective beam splitting layer that functions in a manner similar to the beam splitters hereinbefore described. Only one-half of the entrant light beam 52 from the laser 48 is transmitted through the beam splitter 140 to continue as a measuring beam component 143.

At the moment the laser 48 is activated, one-half of the output beam 52 therefrom is reflected by the beam splitter 140 as a fixed length beam component 145, this component actually combining with the reflectively returned, variable length measuring beam to provide interference fringes. Thus, as hereinbefore explained, the reference beam in the interferometer illustrated in FIG. 8 comprises only that one-half of the entrant light beam 52 that is not transmitted through the beam splitter 140.

The transmitted measuring beam component 143 is internally reflected by one reflective prism face 147 along an angular path as a beam component 148. The measuring beam component 148 is again internally reflected by an angular reflective face 150 of the pentaprism 139 and continues as a measuring beam component 151. A transparent, quarterwave plate 153 is adhesively bonded to a side face of the pentaprism 139 in a manner to be interposed in one-half of the pathway of the measuring beam component 151 projected outwardly from the reflective face 150 of the pentaprism 139. As illustrated in FIG. 10, the transparent quarter wave plate 153 secured to the base of the pentaprism 139 is provided with a transverse edge 154 that operates to divide the projected beam 151 into two, quadrature phase differentiated beam components 155 and 155P. The two adjacent outwardly projected beam components are directed toward the prismatic beam reflector 135 which is represented in FIG. 8 as comprising a prism 156.

As hereinbefore explained, it will be apparent that the prismatic reflector 135 could comprise a trihedral prism inasmuch as the principal requirement is that the input and output beams are in spaced apart parallelism. As shown in FIG. 8, the beam components projected outwardly from the pentaprism 139 are reflected internally by one reflective face 157 of the prism 156 along an internal beam pathway 158. In a similar manner, the phase differentiated beam components from pathway 158 are directed by the reflective face 159 of the prism 156 along a return path identified as the beam 160. The phase differentiated beam components provided in the reflectively returned beam 160 are maintained in like, spaced apart parallelism to the phase differentiated beam components in the beam 155. This relationship is more clearly illustrated in FIG. 10, in which the phase differentiated beam components 160 and 160P reenter the base of the prism 138 in proper alignment for recombining with the non-transmitted reference beam portion of the beam 52 along the beam splitter 140. After recombining along the beam splitting interface 140, the resulting phase differentiated interference fringe patterns 160-145 and 160P-145 are directed along corresponding adjacent paths to actuate a pair of photo detectors 165 and 166 respectively secured to a side face 167 of the prism 137. The photo detectors 165 and 166 are respectively provided with light sensitive detectors 169 and 170 which are adapted to be activated by the phase differentiated fringe patterns 160-145 and 160P-145.

Another modified form of the invention is shown in FIG. 11, in which masks or gratings are used to provide a means of achieving directional sensitivity in electronically counting the interference fringe patterns in a distance measuring interferometer. As thereshown, the entrant laser light beam 52 is directed toward the prism 175 contained within the rectangular enclosure 176. The prism 175 is adhesively bonded to the prism 177 along a semi-silvered interface 178 comprising a beam splitter. The prism 177, in turn, is adhesively bonded to a prism 179 along a semi-silvered interface 180 comprising a beam splitter and beam recombining layer. As hereinbefore explained, the three prisms comprise a unitary prismatic element that is operative to direct a variable length measuring beam toward a prismatic reflector 183 having two reflective faces.

The entrant light beam 52 from the laser 48 is divided by the beam splitter 178 into two split beams including an internal reference beam 185 and an outwardly projected measuring beam 186. The outwardly projected beam 186 is reflected by a first reflective face of the prism 183 as a transversely directed beam component 189. Next, the beam component 189 is reflected outwardly by a second reflective face of the prism 183 as a return beam 190. As hereinbefore explained, beams 186, 189 and 190 constitute one continuous measuring beam, with the reflectively returned beam 190 being disposed in spaced apart parallelism to the beam 186.

The returned measuring beam 190 enters the prism 179 and is combined with the reference beam 185 to develop interference fringe patterns. The recombining is accomplished along the semi-silvered interface 180 which likewise functions to divide the recombined beams into two split beams of fringe patterns 193 and 194 respectively. The interference fringe patterns 193 and 194 are identical and provide the same sequence of alternating dark light bands. Interference fringes 193 are directed outwardly toward a beam enlarging telescope contained within a tubular enclosure 196 formed with the enclosure 176.

The beam enlarging telescope comprises lenses 197 and 198, the latter being centered within the tubular enclosure 196 by a collar 199. The lens 198 effects a beam expanding divergence of the fringe patterns 193. Next, the collimating lens 197 operates to collimate the divergent beam into the parallel expanded fringe patterns 193E.

In a similar manner, the fringe patterns 194 are directed toward a beam diverging a chromatic lens 203 secured by a collar 204 within a tubular enclosure 205. The divergent beam is then transmitted by the lens 206 into a well collimated, expanded beam of fringe patterns 194E. As shown in FIG. 11, the expanded beam of fringe patterns 194E comprises three dark bands and three alternately spaced light bands, the total of six bands corresponding identically to the six bands of the interference fringe patterns 193E.

A transverse support arm 210 secured to the tubular enclosure 205 is provided with a spaced extension 211 to which a photo detector 212 is secured by beams of screws 214. By means of this arrangement, the photo detector 212 is adapted to support a light sensitive detector 215 in fixed stationary relationship to the fringe patterns 194E.

An adjustable mask 218 is interposed between the detector 215 and the fringe patterns 194E. As schematically shown in FIG. 11, the mask 218 is movably carried by an adjusting rod 219 extending through the photo detector and being secured at its opposite end to the support arm 210. A spring 220 normally urges the mask rightwardly into engagement with an adjusting nut 222 threaded on the rightward end of the stationary rod 219. With the fringe patterns 194E disposed as shown in FIG. 11, the mask 218 is so positioned that slotted apertures 224 formed therein are displaced 90° with respect to the dark and light bands constituting the fringe patterns.

Inasmuch as the arrangement for supporting a light sensitive detector 215A and mask 218A relative to interference fringes 193A is identical, corresponding parts are identified by adding a suffix A after each of the reference numerals.

The mask 218A is so positioned by operation of the adjusting nut 222A in a manner that the mask apertures 224A are aligned with the light bands of the interference fringe patterns 193E. Thus, since the fringe patterns 193E are identical to the fringe patterns 194E, the slotted apertures 224A of the mask 218A are displaced 90° with respect to the slotted apertures 224 of the mask 218. It will be apparent, therefore, that the predetermined displacement between the masks 218 and 218A displaced 90°, the detectors 215 and 215A light bands of the fringe pattern.

Whenever the prism 183 is caused to move relative to the prismatic enclosure, the resulting fringe patterns 193E and 194E will activate the light sensitive detectors 215A and 215 respective to indicate the extent of relative movement. Furthermore, with the masks 218 and 218A displaced 90°, the detectors 215 and 215A are activated in a leading or lagging relationship depending upon the direction of relative movement. Therefore, the detectors 215 and 215A are connected to actuate a bidirectional counting circuit (not shown) for indicating both the direction and extent of movement.

In FIG. 12, there is represented a view of the mask 218 in elevation to better illustrate the configuration of the slotted apertures 224.

Although the exemplary embodiments of the invention have been described in considerable detail in order to disclose several forms of practical apparatus incorporating the invention, it is to be understood that the particular structures shown and described are illustrative only, and that the various characteristics of the invention may be incorporated in other structural forms without departing from the spirit and scope of the invention as defined in the subjoined claims.

The principles of this invention have now been fully explained in connection with the foregoing, I hereby claim as my invention:

1. In an interferometer having a laser light source; a prismatic element in the form of a single integrated unit having a single partially light transmissive beam splitter adapted to divide a light beam from said laser light source into two split beams respectively comprising a fixed length reference beam and a variable length measuring beam;

means for defining a variable length measuring beam pathway comprising a relatively movable trihedral prism adapted to receive the measuring beam from said beam splitter and being adapted to reflectively return a spaced apart parallel beam toward said prismatic element;

a reflector fixedly carried by said prismatic element positioned to receive said measuring beam returned by said trihedral prism and reflectively direct the returned beam toward said single beam splitter for recombining with said reference beam to produce interference fringe patterns;

detector means responsive to the fringe patterns resulting from said recombined reference and measuring beams for indicating the extent of relative movement between said trihedral prism and said prismatic element; and means for effecting relative movement between said trihedral prism and said prismatic element.

2. In an interferometer having a light source adapted to project a monochromatic coherent beam of light;

a single unitary prismatic element having a semitransparent and partially reflective beam splitter adapted to reflect one-half of the light beam transversely from said source as a fixed length reference beam and to transmit one-half of the light beam from said light source to constitute a variable length measuring beam;

a prismatic reflector carried for movement relative to said prismatic element along a path parallel to the one-half light beam transmitted by said beam splitter;

plural reflectors carried by said prismatic reflector in position to receive the one-half light beam, reflect the received beam laterally a spaced distance and reflect the laterally reflected beam toward first prismatic element for returning the one-half measuring light beam to said prismatic element in spaced parallel relationship to the original one-half light beam transmitted therefrom;

another reflector fixedly carried by said prismatic element in position to receive the returned one-half light beam from said prismatic reflector and being operative to reflect the returned beam toward said beam splitter for recombining with the other one-half of the light beam reflected therefrom to produce interference fringe patterns;

a light sensitive measuring system responsive to the interference fringes operative to indicate the extent of relative movement between said prismatic element and said prismatic reflector; and, power drive means connected to effect relative movement between said prismatic element and said prismatic reflector.

3. In an interferometric measuring system;

a laser light source adapted to project a coherent beam of monochromatic light;

a single unitary prismatic element carried in fixed relationship to said laser light source and having a single beam splitter adapted to divide a projected beam therefrom into two split beams;

a movable prismatic reflector for receiving one of the split light beams from said prismatic element and reflectively returning the received beam to said prismatic element along a spaced apart parallel pathway;

a fixed reflector fixedly carried by said prismatic element in position to receive the beam reflectively returned from said movable prismatic reflector and adapted to reflect the returned beam toward said single beam splitter carried thereby to be recombined with the other of said split beams to produce interference fringe patterns for indicating the extent of relative movement between said prismatic reflector and said prismatic element;

detector means connected to be actuated by said interference fringe patterns; and a power drive connected to effect relative movement between said prismatic reflector and said prismatic element.

4. In an interferometer provided with a single unitary prismatic element having a single beam splitter for splitting entrant light into two beams including a reference beam and a measuring beam;

a relatively movable unitary prismatic reflector adapted to receive the measuring beam and reflectively return a spaced apart parallel beam toward said prismatic means;

reflective means carried by said unitary prismatic element and being adapted to redirect the returned beam to said single beam splitter for recombining with said reference beam and to develop two separate sets of identical interference fringe patterns;

means for effecting relative movement between said unitary prismatic element and said prismatic reflector;

a pair of grated masks respectively interposed in the paths of the two interference fringe patterns and operable to modify the respective sets of fringe patterns one of said masks being offset from the other relative to said interference fringe patterns; and a light sensitive detector in the path of each modified fringe pattern from said masks to be actuated thereby for measuring the extent of movement and each being responsive to the leading or lagging relationship of the activation relative to the other detector caused by the offsetting of said masks to determine the direction of movement.

5. In an interferometer having a measuring light beam and a reference light beam;

a beam splitter adapted to receive said measuring and reference light beams for recombining to produce interference fringe patterns and produce two beams of identical fringe patterns respectively comprising alternating dark and light bands;

a pair of apertured light masks respectively provided with parallel slotted apertures corresponding in width to the bands comprising said fringe patterns and the space between them being of the same width;

adjusting means for supporting one of said masks in the paths of each of the interference fringe patterns from said beam splitter for predeterminately modifying said fringe patterns and for offsetting one of said masks from the other relative to said interference fringe patterns;

a light sensitive detector in the path of each of said modified fringe pattern from said masks; and means for effecting relative movement between said reflector and said prismatic means and said light detectors are activated by said interference fringe pattern for measuring the extent of movement and being responsive to the leading or lagging relationship of the activation relative to the other caused by the offsetting of said masks for determining the direction of movement.

6. In an interferometer comprising a base and a cooperating table carried by said base for relative rectilinear movement;

a laser carried by said base adapted to project a collimated light beam toward said table and parallel to the rectilinear path of movement thereof;

a unitary prismatic element having a single semitransparent beam divider and being fixedly secured to said base in an angularly interposed beam intercepting position relative to the beam from said laser, said beam divider adapted to divide the entrant beam into two diverging split beams comprising a measuring beam projected outwardly toward said table along a path parallel to the path of movement thereof and a transversely directed fixed length reference beam;

prismatic reflector means fixedly carried by said table in a position to receive the output beam from said beam divider and reflectively return a continuous spaced apart parallel measuring beam toward said unitary prismatic element;

an angular reflector fixed to said unitary prismatic element for continuously reflecting the returned beam from said reflector means transversely toward said beam divider along a direction and path aligned with said divided fixed length reference beam from said laser for combining therewith to provide interference fringe patterns, said prismatic reflector means and said angular reflector providing a continuous unidirectional pathway for the variable length measuring beam; and, a light responsive counting device actuated by said interference fringe patterns for indicating the extent of relative movement between said table and said base.

7. An interferometer according to claim 6 including phase differentiating means fixedly interposed in the path of one of said two diverging split light beams that originate from said single beam divider in such a manner as to divide the associated one of said diverging beams into two phase differentiated beam portions and being operative to provide two corresponding phase differentiated portions in the interference fringe patterns of said recombined beams; and, said counting device comprising separate detector means carried by said frame and being respectively responsive to the phase differentiated interference fringe patterns in said recombined split beams for indicating the direction and extent of relative movement between said unitary prismatic element carried by said frame and said prismatic reflector carried by said relatively movable member.

* * * * *